US009266984B2

(12) United States Patent
Tabata et al.

(10) Patent No.: US 9,266,984 B2
(45) Date of Patent: Feb. 23, 2016

(54) POLYTETRAFLUOROETHYLENE RESINS THAT CAN BE PROCESSED BY SHAPING, SHAPED PRODUCTS THEREOF, AND PROCESSES FOR PRODUCING THE RESINS AND SHAPED PRODUCTS

(75) Inventors: Yoneho Tabata, Tokyo (JP); Hideto Suzuki, Tokyo (JP); Shigetoshi Ikeda, Tokyo (JP); Minoru Iida, Tokyo (JP); Minoru Kawai, Zama (JP); Gen Kojima, Machida (JP); Yasuhiko Sawada, Settsu (JP)

(73) Assignees: RAYTECH CORPORATION, Tokyo (JP); DAIKIN INDUSTRIES, LTD., Osaka (JP)

( * ) Notice: Subject to any disclaimer, the term of this patent is extended or adjusted under 35 U.S.C. 154(b) by 211 days.

(21) Appl. No.: 13/120,121

(22) PCT Filed: Sep. 30, 2009

(86) PCT No.: PCT/JP2009/067074
§ 371 (c)(1),
(2), (4) Date: Mar. 21, 2011

(87) PCT Pub. No.: WO2010/038800
PCT Pub. Date: Apr. 8, 2010

(65) Prior Publication Data
US 2011/0171403 A1 Jul. 14, 2011

(30) Foreign Application Priority Data
Sep. 30, 2008 (JP) ................................ 2008-253442

(51) Int. Cl.
C08J 3/28 (2006.01)
C08F 114/26 (2006.01)

(52) U.S. Cl.
CPC ................ C08F 114/26 (2013.01); C08J 3/28 (2013.01); *C08J 2327/18* (2013.01); *Y10T 428/1345* (2015.01)

(58) Field of Classification Search
CPC ....... C08F 114/26; C08J 3/28; C08J 2327/18; Y10T 428/1345
USPC ....................................................... 522/156
See application file for complete search history.

(56) References Cited

U.S. PATENT DOCUMENTS

| 2,772,444 | A | | 12/1956 | Burrows et al. | |
|---|---|---|---|---|---|
| 3,766,031 | A | | 10/1973 | Dillon | |
| 3,838,030 | A | | 9/1974 | Kagiya et al. | |
| 3,953,566 | A | | 4/1976 | Gore | |
| 4,025,598 | A | | 5/1977 | Sasshofer et al. | |
| 4,187,390 | A | | 2/1980 | Gore | |
| 5,444,103 | A | * | 8/1995 | Tabata et al. | 522/5 |
| 5,466,531 | A | | 11/1995 | Tippett et al. | |
| 5,698,300 | A | | 12/1997 | Wimmer et al. | |
| 5,985,949 | A | * | 11/1999 | Seguchi et al. | 522/5 |
| 6,465,575 | B1 | * | 10/2002 | Kusano et al. | 525/199 |
| 6,482,859 | B1 | | 11/2002 | Zeller et al. | |
| 6,762,215 | B2 | * | 7/2004 | Udagawa et al. | 522/156 |
| 7,220,799 | B2 | * | 5/2007 | Udagawa et al. | 525/199 |
| 2002/0161067 | A1 | * | 10/2002 | Udagawa et al. | 522/156 |
| 2004/0168417 | A1 | | 9/2004 | Tanaka et al. | |
| 2004/0175567 | A1 | | 9/2004 | Huang et al. | |
| 2004/0220294 | A1 | * | 11/2004 | Udagawa et al. | 522/155 |
| 2009/0029136 | A1 | * | 1/2009 | Hayashi et al. | 428/220 |

FOREIGN PATENT DOCUMENTS

| JP | 49-48671 | B | 12/1974 |
|---|---|---|---|
| JP | 51-88727 | A | 8/1976 |
| JP | 52-25419 | | 7/1977 |
| JP | 61-146522 | A | 7/1986 |
| JP | 8-505330 | A | 6/1996 |
| JP | 2571379 | B2 | 1/1997 |
| JP | 10-503725 | A | 4/1998 |
| JP | 11-241217 | A | 9/1999 |
| JP | 11-241218 | A | 9/1999 |
| JP | 2000-26614 | A | 1/2000 |
| JP | 2000-86774 | A | 3/2000 |
| JP | 2001-48923 | A | 2/2001 |
| JP | 2001-513529 | A | 9/2001 |
| JP | 2002-80672 | A | 3/2002 |
| JP | 3317452 | B2 | 8/2002 |
| JP | 2002-265630 | A | 9/2002 |
| JP | 2002-282627 | A | 10/2002 |
| JP | 2002-301321 | A | 10/2002 |
| JP | 2002-327067 | A | 11/2002 |
| JP | 2002-327068 | A | 11/2002 |
| JP | 2003-12815 | A | 1/2003 |
| JP | 2003-523436 | A | 8/2003 |
| JP | 2004-244787 | A | 9/2004 |
| JP | 3566805 | B2 | 9/2004 |

(Continued)

OTHER PUBLICATIONS

J.S. Forsythe et al. The Radiation Chemistry of Fluoropolymers. Progress in Polymer Science, 25 (2000), 101-132.*
Oshima et al. Radiation Induced Crosslinking of Polytetrafluoroethylene. Radiation Physics and Chemisty, vol. 45. No. 2, pp. 269-372 (1995).*
(2003). ANTEC 2003 Plastics: Annual Technical Conference, vol. 3: Special Areas. Society of Plastics Engineers. Online version available at: http://app.knovel.com/hotlink/toc/id:kpANTECPI2/antec-2003-plastics-annual.*
A. Oshima et al., "High Energy Ion Beam Irradiation Effects on Perfluorinated Polymers", A Book of Abstracts for the Symposium of the Japanese Society of Radiation Chemistry, 2005, pp. 147-148.
E. Katoh et al., "Evidence for radiation induced crosslinking in polytetrafluoroethylence by means of high-resolution solid-state 19F high-speed MAS NMR", Radiation Physics and Chemistry, 1999, vol. 54, pp. 165-171.

(Continued)

*Primary Examiner* — Sanza McClendon
(74) *Attorney, Agent, or Firm* — Birch Stewart Kolasch & Birch, LLP

(57) ABSTRACT

A polytetrafluoroethylene resin comprising polytetrafluoroethylene having a two-dimensional branched structure in the molecule is produced by exposing polytetrafluoroethylene to an ionizing radiation at a dose of no more than 10 kGy.

8 Claims, 5 Drawing Sheets

(56) References Cited

FOREIGN PATENT DOCUMENTS

| | | |
|---|---|---|
| JP | 2005-113116 A | 4/2005 |
| JP | 3836255 B2 | 10/2006 |
| JP | 2007-77323 A | 3/2007 |
| JP | 3913535 B2 | 5/2007 |
| JP | 2007-237597 A | 9/2007 |
| JP | 2007-314645 A | 12/2007 |
| JP | 2008-69280 A | 3/2008 |
| WO | WO 01/60911 A1 | 8/2001 |

OTHER PUBLICATIONS

International Search Report for PCT/JP2009/067074, mailed on Dec. 15, 2009.

Shigetoshi Ikeda, "Creation of a Novel Fluoro-resin by Radiation and Its Applications", Doctor's Thesis Presented at The University of Tokyo.

* cited by examiner

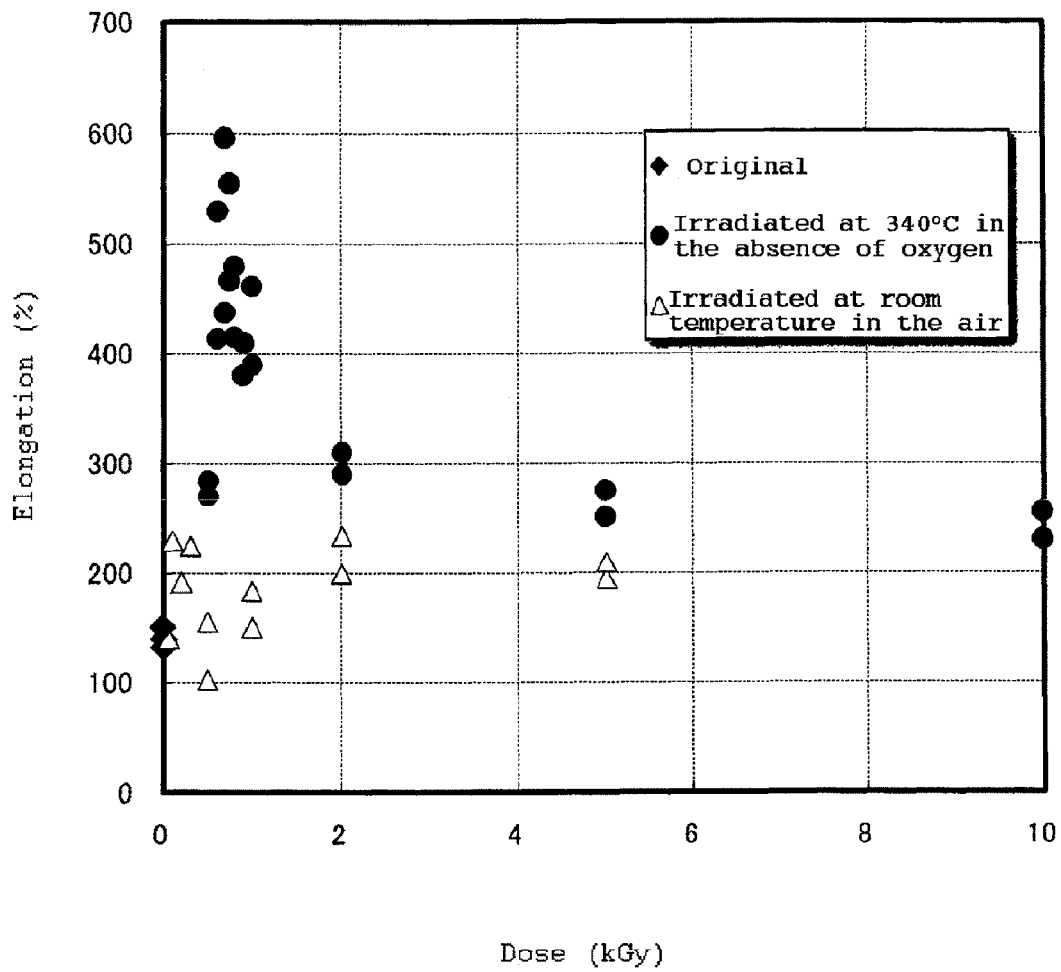
FIG. 1 Results of Evaluating Elongation at Break of PTFE Under Tension at High Temperature

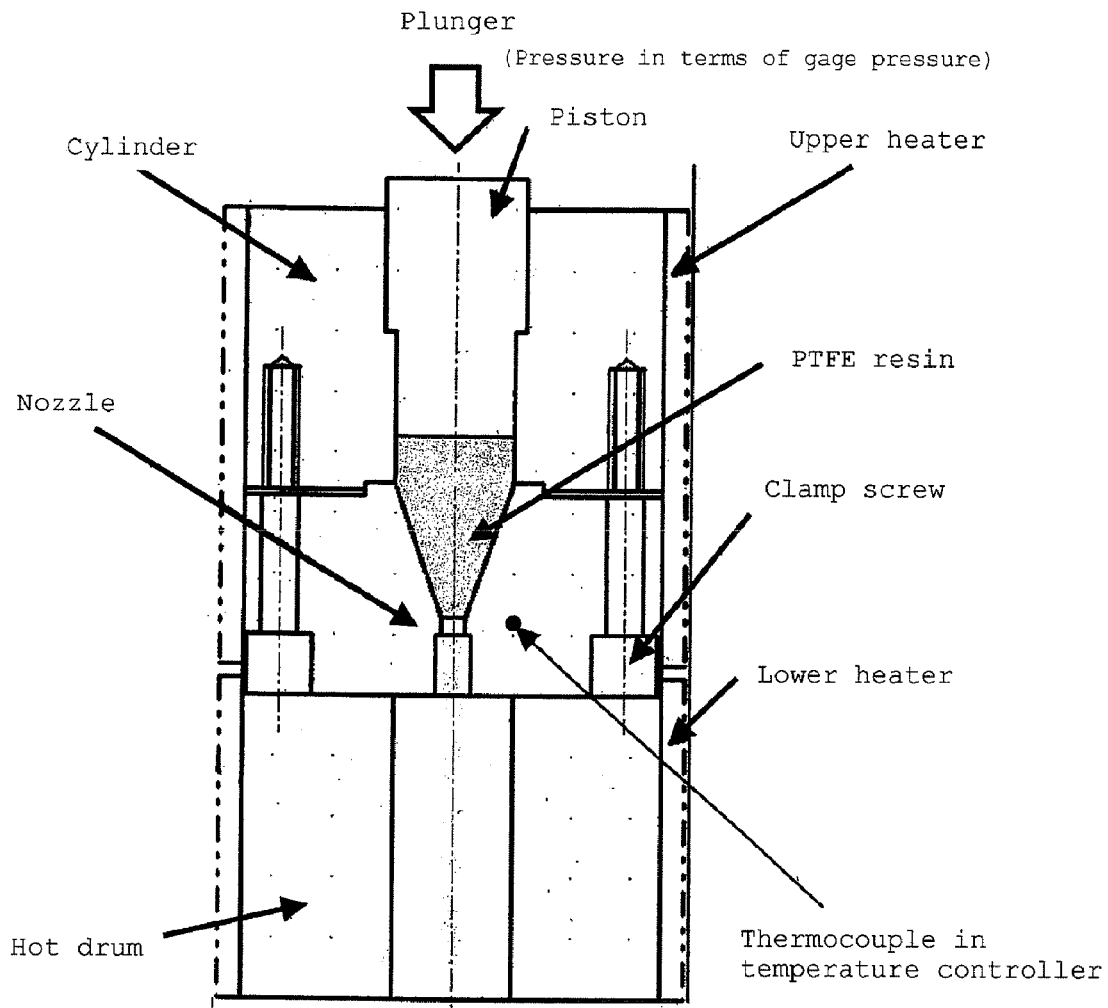
FIG. 2 Schematic Section of PTFE Melt Extruding Machine
(with piston pushed down to the lowest position)

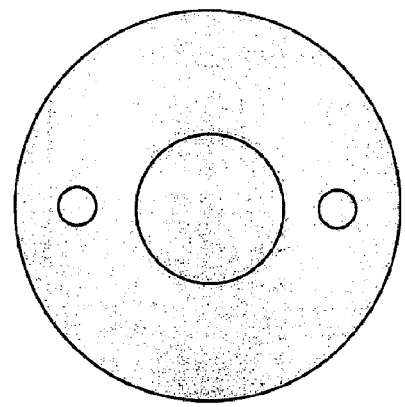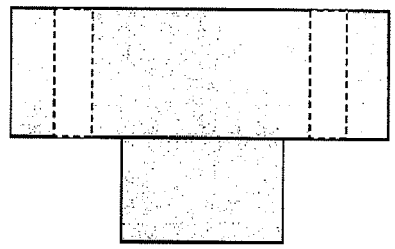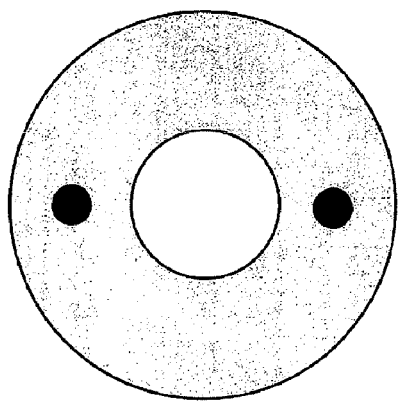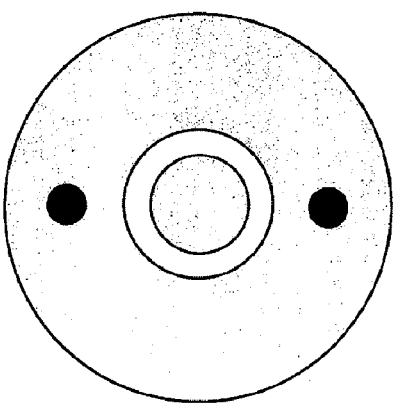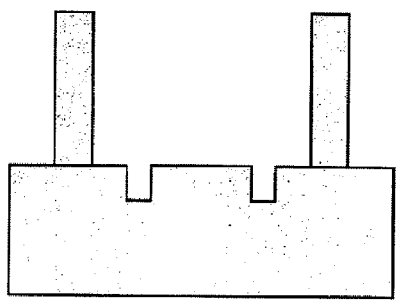
FIG. 3 Schematic Section of Stamping Machine
(for shaping rings)

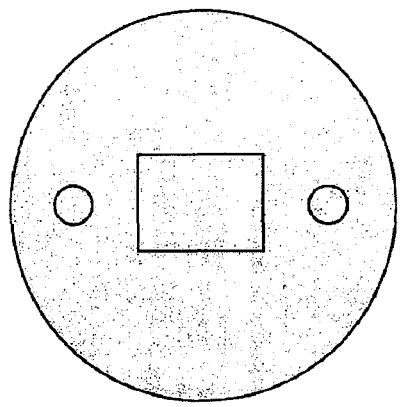
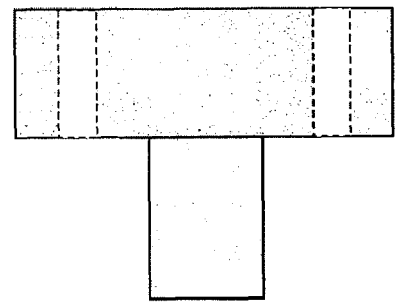
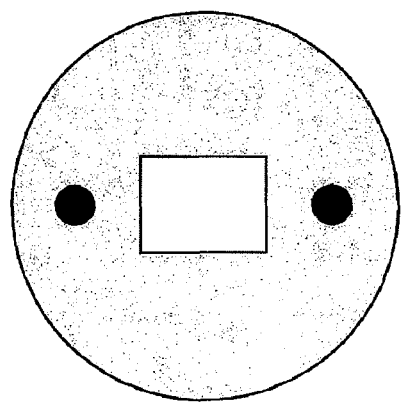
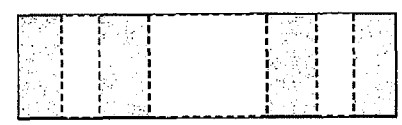
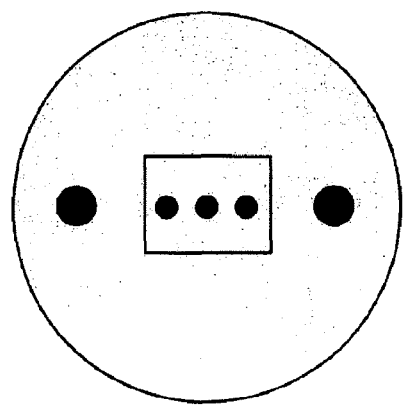
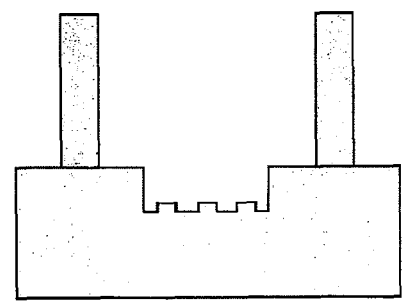
FIG. 4 Schematic Section of Stamping Machine
(for shaping concave blocks)

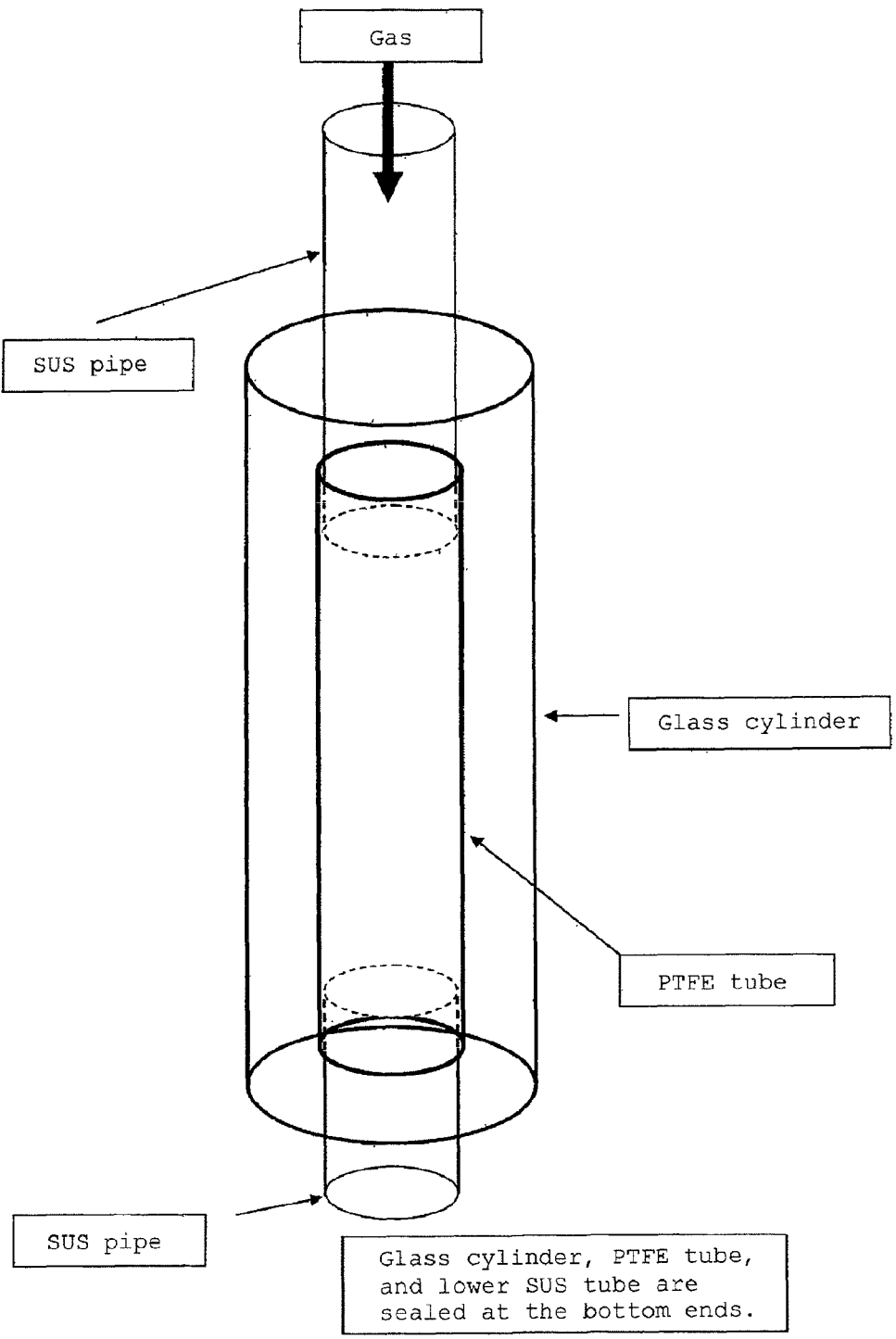
FIG. 5 Schematic of Inflation Apparatus

POLYTETRAFLUOROETHYLENE RESINS THAT CAN BE PROCESSED BY SHAPING, SHAPED PRODUCTS THEREOF, AND PROCESSES FOR PRODUCING THE RESINS AND SHAPED PRODUCTS

TECHNICAL FIELD

The present invention relates to the art of imparting a branched structure (which may also called a long-chain branched structure or a moderately crosslinked structure) to polytetrafluoroethylene so that it can be processed by shaping.

BACKGROUND ART

Polytetrafluoroethylene (hereinafter abbreviated as PTFE) is a substance having an extremely high degree of rubber elasticity such that even if it is heated to 380° C. above its melting point, it displays a melt viscosity of $10^{10}$ to $10^{12}$ Pa·S. Hence, unlike conventional resins, PTFE is not amenable to common shaping processes (e.g. melt forming) and is typically, for example, shaped by compressing a PTFE powder and heating the compact.

Currently, PTFE bulk powders are produced by polymerizing a tetrafluoroethylene monomer (hereinafter abbreviated as TFE) through chemical catalysis. The molecular chains in the resulting PTFE are straight-chained or linear, substantially free of branches, and have no crosslinked structure. The PTFE powder produced by suspension polymerization is called a molding powder whereas the PTFE powder produced by emulsion polymerization is called a fine powder.

Having a very high melt viscosity even at temperatures beyond its melting point, PTFE cannot be processed by shaping methods that are feasible with conventional thermoplastic resins. Hence, special processing methods are employed to make shaped articles of PTFE. In the case of the molding powder, it is commonly compressed into a shape, which is sintered and compacted, and then subjected to diverse finishing processes to make blocks, films, sheets, round bars, thick-walled pipes, and various cut articles.

In the case of the fine powder, it is commonly blended with an oil to form a homogeneous paste, which is shaped by extrusion and then dried and sintered into final products such as tubes, green tape, and filters.

Elongated round bars and tubes are sometimes produced by melt forming through ram extrusion molding (an application of compressive forming, in which filling with a powder, compressing, sintering, and cooling are continuously performed). However, ram extrusion molding differs from the ordinary melt extrusion molding in that the particulate resin is fed intermittently. Intermittent feeding of the resin necessitates repeated feeding and compressing of the resin, and an interface forms between stacked layers of the resin feed. In addition, the resin powder that is to be used in ram extrusion molding which needs to be automatically fed into the hopper is required to have high fluidity, so it is typically a granulated powder or a pre-sintered powder. As a result, resin particles often find difficulty in coalescing firmly under heating and the shaped articles have problems with strength and elongation. The failure to provide adequate coalescing has caused another problem, i.e., the occurrence of cracks and voids in the shaped articles.

Diaphragms may be formed by hot coining (i.e., a feed powder is filled into a mold and, after compressing the powder under heating at a temperature equal to or above its melting point, the powder is cooled for shaping as it is kept compressed); in this and other cases of making a variety of coated articles as well as impregnated products such as a glass cloth, a dispersion medium is used.

As mentioned earlier, PTFE bulk powders are currently produced by polymerizing TFE through chemical catalysis. The molecular chains in the resulting PTFE are straight-chained and substantially free of branches to feature a high degree of crystallinity. The degree of crystallinity of commercial PTFE bulk powders as produced by emulsion polymerization or suspension polymerization depends on their molecular weight but immediately after polymerization, they have more than 90% crystallinity irrespective of which method of polymerization was used; according to measurement with a differential scanning calorimeter, the commercial PTFE bulk powders have temperatures of crystal fusion at 340° C. and above, with an enthalpy of crystal fusion in excess of 55 J/g. Once these resins are sintered above their temperatures of crystal fusion, their melting points will shift to about 327° C. and their enthalpies of crystal fusion drop to 30 J/g and less. By sintering, the degree of crystallinity which was previously in excess of 90% drops to several tens of percent.

Some low-molecular weight PTFE powders can be obtained by exposing high-molecular weight PTFE bulk powders to a radiation in the air (in the presence of oxygen) so that the molecular chains are cut by radiolysis to lower the molecular weights of the bulk powders. In this case, too, the molecular chain in the PTFE has an unbranched, straight-chained structure.

The present inventors previously found that when a PTFE resin was exposed to 1 kGy or more of an ionizing radiation (hereinafter referred to simply as a radiation) at a temperature not lower than the melting point of the crystal of PTFE resin and in the absence of oxygen, crosslinking occurred to cause a great change in the characteristics of the PTFE resin (Patent document 1). Upon further scientific verification, the present inventors demonstrated that a Y-shaped higher-order structure was formed by crosslinking (Patent document 2). These inventions generally involve crosslinking a polymerized PTFE resin as a starting material, so that it is provided with a crosslinked structure to have wear resistance and creep resistance.

The present inventors also discovered that when a PTFE resin with a temperature, lower than its melting point was exposed to an electron beam (200 kGy to 10 MGy) at high dose rate (capable of imparting a large quantity of energy per unit time), the PTFE resin could be crosslinked even under such a condition that the initial resin temperature had not reached its melting point (Patent document 3).

The present inventors further discovered that when the radicals generated in PTFE upon exposure to a radiation (30-60 kGy) were subjected to graft polymerization with TFE, a Y-shaped higher-order structure was formed (Patent document 4).

Further in addition, the present inventors discovered that when a PTFE resin heated to a temperature lower than its melting point was exposed to a synchrotron radiation or high-intensity X-rays (1 kGy to 10 MGy) at high dose rate (capable of imparting a large quantity of energy per unit time), the PTFE resin could be crosslinked even under such a condition that the initial resin temperature had not reached its melting point (Patent document 5).

The present inventors also invented a method of producing an ultrafine PTFE powder with a particle size of no more than 1 μm by exposing TFE to a radiation (5-1000 kGy) in the solvent acetone (Patent document 6). The invention enables control over molecular weight under varied conditions so that ultrafine PTFE powders having a crosslinked structure can be produced over a wide range of molecular weights ranging from low to high values.

The present inventors further invented a method of producing PTFE with a crosslinked structure by exposing TFE to a radiation (10-1000 kGy) under low temperature (−196° C.). In this invention, too, scientific verification was made to demonstrate that a Y-shaped higher-order structure was formed in the resulting crosslinked PTFE (Patent document 7).

Ohshima et al. discovered that when a PTFE resin heated to a temperature lower than its melting point was exposed to an ion beam of high LET (linear energy transfer, or an energy imparted to a medium by radiation passing through it), the PTFE resin could be crosslinked even under such a condition that the initial resin temperature had not reached its melting point (Non-patent document 1).

The PTFE crosslinking related techniques described above are each directed to constructing a three-dimensional intermolecular structure by providing a solid crosslinked structure in the PTFE.

Techniques that have been developed for exposing PTFE to a radiation are such technology that high-molecular weight PTFE bulk powders are exposed to a radiation in the air (in the presence of oxygen) so as produce low-molecular weight PTFE powders. In this technology, the molecular chains are cut by radiolysis to lower the molecular weights of the bulk powders. As a matter of course, the produced low-molecular weight PTFE powder assumes an uncrosslinked, but straight-chained, molecular structure (JP 2008-69280 A, Patent document 9, Patent document 10, and Patent document 11).

Similarly, Patent document 13 describes a technique in which a once sintered shape is exposed to an ionizing radiation so that it can be stretched by an increased ratio; Patent document 13 describes a technique in which PTFE having higher deformability than the conventional PTFE shape is produced by irradiation; and Patent document 14 describes a technique in which a PTFE resin is exposed to an ionizing radiation so that a thin-walled PTFE tube can be prepared at high draw ratio; however, none of these techniques is directed to imparting a branched structure to the molecular chains. The PTFE obtained by these techniques has no more than a straight-chained molecular structure and its molecular weight has been reduced to such a level that the materials strength of PTFE will not be lost; those techniques are conceptually dissimilar to the present invention.

Patent document 15 provides a description of PTFE with a branched structure. However, the branched structure described in this publication is "macroscopic" in that it refers to the branching of fibers. In contrast, the branched structure as referred to in the present invention is at the molecular level which has a totally different meaning from the macroscopic structure.

PTFE can be shaped into fibers by various methods including the matrix spinning (or emulsion spinning) method, the splitting method, and the paste extruding method.

In the matrix spinning method, a liquid mixture of a PTFE dispersion and a matrix (which may be viscose) is extruded into a coagulating bath to form fibers and, thereafter, the greater part of the matrix is evaporated by firing and the PTFE is melted to coalesce, thereby producing PTFE fibers. Known techniques that may be classified as the matrix spinning method are described in Patent document 16, Patent document 17, and Patent document 18, In the splitting method, a PTFE powder is compressed in a cylinder and the compact is sintered and subsequently split into filaments, which are then stretched. Known techniques that may be classified as the splitting method are described in Patent document 19, Patent document 20, Patent document 21, and Patent document 22.

In the paste extruding method, a PTFE powder is mixed with a petroleum-based oil or the like and the mixture is kneaded to form a paste which is extruded into a bar which, in turn, is trimmed, freed of the oil, and stretched or drawn. A known technique that may be classified as the paste extruding method is described in Patent document 23.

Other techniques that are classified as the paste extruding method are described in Patent document 24 and Patent document 25; a PTFE resin powder is blended with a petroleum-based oil or the like as an extrusion molding aid to make a compound, which is preliminarily shaped and the resulting preform is extruded as paste fibers, which are then dried, sintered, and drawn into PTFE resin fibers, provided that prior to the drawing step, the fibers are irradiated to be crosslinked. The method of making and processing fibers in these techniques consists of making a paste of the PTFE resin powder, shaping it into fibers, and drawing the fibers. This conventional method is yet to be sophisticated to enable the melt forming of PTFE.

Patent document 26 discloses a PTFE lamination technology but the PTFE films to be laminated have already been drawn and they are not sintered in the process of lamination.

CITATION LIST

Patent Document

Patent document 1: Registered Japanese Patent No. 3317452
Patent document 2: Registered Japanese Patent No. 3566805
Patent document 3: Registered Japanese Patent No. 3836255
Patent document 4: JP 2000-86774 A
Patent document 5: Registered Japanese Patent No. 3913535
Patent document 6: JP 2000-26614 A
Patent document 7: JP 2008-69280 A
Patent document 8: JP 49-48671 B
Patent document 9: JP 52-25419 B
Patent document 10: JP 2001-513529 A
Patent document 11: U.S. Pat. No. 3,766,031
Patent document 12: JP 61-146522 A
Patent document 13: JP 2007-77323 A
Patent document 14: JP 2007-237597 A
Patent document 15: JP 2004-244787 A
Patent document 16: JP 2002-282627 A
Patent document 17: Registered Japanese Patent No. 2571379
Patent document 18: U.S. Pat. No. 2,772,444
Patent document 19: JP 51-88727 A
Patent document 20: JP 2004-244787 A
Patent document 21: U.S. Pat. No. 3,953,566
Patent document 22: U.S. Pat. No. 4,187,390
Patent document 23: JP 2002-301321 A
Patent document 24: Japanese Patent Application No. 11-241217
Patent document 25: Japanese Patent Application No. 11-241218
Patent document 26: JP 10-503725 A Non Patent Document Non-patent document 1: Ohshima, A., et al; "High Energy Ion Beam Irradiation Effects on Perfluorinated Polymers" in A Book of Abstracts for the Symposium of the Japanese Society of Radiation Chemistry, 147-148, 2005

Non-patent document 2: Katoh, E., et al., "Evidence for radiation induced crosslinking in polytetrafluoroethylene by means of high-resolution solid-state $^{19}$F high-speed MAS NMR" In Radiation Physics and Chemistry, 54, 165-171, 1999

Non-patent document 3: Shigetoshi Ikeda, Creation of A Novel Fluoro-resin by Radiation and Its Applications, Doctor's Thesis Presented at The University of Tokyo As already mentioned, PTFE has a very high melt viscosity even if it is heated to its melting point, so it cannot be processed by shaping methods similar to those which are practiced on common thermoplastic resins and the shaped PTFE articles have to be processed by special methods. Because of such limitations on the shaping methods, the shape of PTFE products is also limited, with the inevitable restriction of their applications. In addition, the special processing methods are directly reflected in the higher cost of the products, again baffling the efforts toward expanding the applicability of PTFE.

As described above, the inventions of crosslinking that imparts a three-dimensional network structure to PTFE resins have successfully imparted a higher-order structure to PTFE so that it has higher resistance to radiation, wear, and creep. However, the PTFE is by no means improved in processability by shaping. On the contrary, the PTFE provided with a three-dimensional structure by crosslinking has become even more difficult to process by shaping.

SUMMARY OF INVENTION

Technical Problem

An object, therefore, of the present invention is to impart processability by shaping to PTFE which is so difficult to process by shaping that it has heretofore been processed by special techniques, whereupon it has become possible to manufacture products by processing methods similar to those which are practiced on common thermoplastic resins, the products being characterized by having heretofore unattainable shapes (having extremely small thickness, extremely small diameter, or high draw ratio).

Another object of the present invention is to provide a novel process for producing a shaped PTFE article under different conditions from those conventionally used to impart a three-dimensional structure to PTFE.

Solution to Problem

In order to solve the aforementioned problems with PTFE, the present inventors made intensive studies and found that when PTFE was exposed to an extremely small dose of ionizing radiation under such conditions that radiation-induced crosslinking of the PTFE would occur, namely, at a temperature just above the melting point of the PTFE and in the absence of oxygen, a two-dimensional structure such as a branched structure could be formed in the PTFE. PTFE resins having a branched structure in the molecule are ductile and can be processed by common shaping techniques. The PTFE resin of the present invention can be processed by shaping, and using this resin, one can manufacture PTFE products by shaping techniques that are common in the prior art and, at the same time, one can even create products of heretofore unattainable shapes (having extremely small thickness, extremely small diameter, or high draw ratio).

Advantageous Effect of Invention

Use of the PTFE according to the present invention which can be processed by shaping enables films, rods, tubes, fibers, monofilaments and the like to be produced by common shaping or processing methods. The PTFE provided with a branched structure is so highly drawable that the products mentioned above have the features that are absent from the conventional PTFE. Stated specifically, it becomes possible to provide extremely thin films, extremely thin-walled tubes, extremely fine fibers, monofilaments, highly shrinkable tubes, stamped articles, laminations, etc.

BRIEF DESCRIPTION OF THE DRAWINGS

FIG. 1 is a graph showing the elongation at break of a PTFE resin in a high-temperature tensile test.

FIG. 2 is a vertical section of a PTFE melt extrusion molding machine.

FIG. 3 is a cross section of a stamping machine (to form a ring).

FIG. 4 is a cross section of another stamping machine (to form a block).

FIG. 5 is a schematic representation of an inflation machine.

DESCRIPTION OF EMBODIMENTS

The present invention relates to PTFE resins including PTFE having a two-dimensional branched structure in the molecule. The expression "having a two-dimensional branched structure in the molecule" means that the molecule is neither straight-chained nor linear but has a two-dimensional structure containing branching sites. The two-dimensional branched structure may contain "a crosslinked structure" but this is limited to "a two-dimensional crosslinked structure" and does not mean a crosslinked structure forming a three-dimensional network. To prove that the PTFE resin of the present invention has a two-dimensional branched structure rather than a three-dimensional network structure, the results of $^{19}$F solid-state NMR and evaluation of wear characteristics may be analyzed comprehensively.

The PTFE resin according to the present invention can be produced by exposing a PTFE resin to an ionizing radiation at a dose of no more than 10 kGy. To prevent the reaction between oxygen and PTFE, irradiation may be performed in the absence of oxygen, namely, under vacuum or in an inert gas atmosphere (e.g. nitrogen, argon, or helium). Examples of the radiation that may be applied include an electron beam, X-rays, a neutron beam, and high-energy ions. To produce the PTFE resin of the present invention, commercial grades of PTFE with molecular weights of about 1,000,000-10,000,000 may be used. The PTFE resin having the value of SSG (Standard specific gravity) of from 2.140 (lower limit) to 2.220 (upper limit) is preferred. SSG is the index of the molecular weight of the PTFE having no melt moldability defined in ASTM-D4895-89. The tetrafluoroethylene (TFE) homopolymer and the copolymer of TFE and the other monomer (modified PTFE) are also preferred as the commercial PTFE. The modified PTFE includes hexafluoropropylene, chlorotrifluoroethylene, fluoro(alkylvinylether) having 1-5 carbon atoms, cyclic fluorinated monomer and so on. The method of polymerizing can be conducted by well-known method, such as emulsion polymerization or suspension polymerization. The PTFE underwent the thermal history over the melting point, and the PTFE underwent the thermal history over the melting point after compacting shaping can be used. The mechanism of branching in the PTFE resin would be as follows: upon irradiation, radicals are generated in the PTFE molecule and another PTFE fragment binds to each of those radicals, whereby two-dimensional branching occurs; an increase in the radiation dose leads to an increase in the number of binding fragments, eventually causing a shift from the two-dimensional to a three-dimensional branched structure. By $^{19}$F solid-state NMR analysis, two things can be verified, the formation of the branched structure, and the increase in the number of branches that results from the increase in the radiation dose. By evaluation and analysis of wear characteristics, one can verify that when the PTFE resin is exposed to a radiation at a dose in excess of about 20 kGy, a three-dimensional branched structure is formed to change the materials characteristics of the resin. By applying the radiation at a dose not higher than about 10 kGy as in the method of the present invention, two-dimensional branching can be created in the molecule without causing a considerable drop in the molecular weight. A further advantage of applying no more than 10 kGy of radiation is that comparatively fewer radicals (i.e., fewer branching points) are generated in the PTFE molecule to thereby increase the distance between branching points; as a result, two-dimensional branching can be generated without forming a three-dimensional network structure. If the radiation is applied at an intensity in great excess of 20 kGy, say, at 50 kGy or 100 kGy, a sufficiently solid three-dimensional network structure is formed that the processability by shaping of the PTFE resin is completely lost. The temperature at which the PTFE resin is irradiated depends on other conditions of irradiation but this can be performed at room temperature up to about 360° C. If the PTFE resin is irradiated at a temperature in excess of 360° C., a decomposition reaction becomes predominant and materials deterioration is likely to occur.

The PTFE resin of the present invention can be easily processed by conventional shaping methods. Shaping of the resin is implemented at temperatures less than its melting point if plastic forming is to be done in a solid phase but at temperatures equal to or above its melting point if melt forming is to be done in a molten state. It should, however, be noted that in the case of plastic forming in a solid phase, the shaping temperature is preferably 150-326° C. in order to minimize the flowability of the resin or its deformation after processing. Here, the lower limit of temperature is set at 150° C. because it is preferred to set a temperature that is not lower than the glass transition temperature of PTFE (130° C.) or the transition temperature that corresponds to α-dispersion. In the case of melt forming in a molten state, the forming temperature is preferably set between 327° C. and 390° C. in order to suppress thermal deterioration of the resin. Beyond 400° C., the decomposition reaction progresses gradually in PTFE, potentially causing materials deterioration.

If the PTFE resin of the present invention is processed by shaping, various forms of shaped articles can be produced. Exemplary shaped articles include rods, fibers, tubes, and films, and these can be used in the same manner as shaped articles from such plastics as polyolefins and polyesters. Alternatively, the PTFE resin of the present invention may be processed by melt spinning and other conventional methods that enable it to be used as fishing lines, guts, woven fabrics, knit fabrics, and so forth. If desired, the PTFE resin of the present invention may be drawn uniaxially, biaxially or multi-axially to produce heat shrinkable products. Further in addition, the PTFE resin of the present invention may be processed by compression in a molten state within a mold to produce compacts. Alternatively, the PTFE resin of the present invention may be processed by melt extrusion lamination to produce laminations. As described above, the PTFE resin of the present invention can be easily processed by shaping and the resin itself as well as its shaped articles find use in a wide range of applications.

On the following pages, the present invention will be described specifically by reference to examples but it should be understood that the scope of the invention is in no way limited by those examples.

Example 1

A commercial grade of PTFE resin (product of NICHIAS Corporation; NAFLON® PTFE rod TOMBO® No. 9002 sized 30$^\phi$ in diameter by 40 mm long, or NAFLON® PTFE tape TOMBO® No. 9001 with a thickness of 0.5 mm) was placed in glass ampoules (holder portion: 50$\phi$×100 mm$^L$); after evacuation for 24 hours, the glass ampoules were heat-sealed at $10^{-4}$ torr. As they were heated at 340° C., the ampoules were irradiated with 0.1-100 kGy of gamma rays from $^{60}$Co to prepare samples for processing by shaping.

Example 2

(Scientific Proof of Two-Dimensional Branched Structure)

The polymerized samples of Example 1 were analyzed for its structure by $^{19}$F high-speed magic angle spinning nuclear magnetic resonance ($^{19}$F solid-state NMR) measurement with BRUKER AVANCE 300 under the following conditions: resonant frequency, 282 MHz; MAS frequency, 30 kHz; recycle delay time, 10 sec; 90° pulse width, 2.5 μs; temperature, 25° C. On account of the heat of friction from MAS, the sample temperature rose to about 70° C. In the non-irradiated sample and the sample irradiated with 10 kGy of gamma rays, only a signal assignable to —$CF_2$—$CF_2$—$CF_2$— was observed at around −122 ppm; in the samples irradiated with 50 kGy and 100 kGy of gamma rays, a signal assignable to —$CF_2$—$CF(CF_2$—)—$CF_2$— was observed at around −109 ppm in addition to the signal at around −122 ppm. For the PTFE irradiated with gamma rays at a dose in excess of 100 kGy under the same conditions, analysis had already been done to give a signal at around −109 ppm that was assignable to —$CF_2$—$CF(CF_2$—)—$CF_2$—. The sample irradiated with 100 kGy of gamma rays allowed a more intense signal to be observed than the sample irradiated with 50 kGy of gamma rays, and the past study (Non-patent document 2) showed that the signal intensity increased with increasing irradiation dose in the range of up to 10,000 kGy. Thus, in response to irradiation with gamma rays, the structural portion of —$CF_2$—$CF(CF_2$—)—$CF_2$— gradually formed and at doses of about 50 kGy and more, it began to be observed by $^{19}$F solid-phase NMR analysis. It is therefore scientifically evident that the branched structure was formed in response to irradiation with no more than 10 kGy of gamma rays although it was below the limit of detection by $^{19}$F solid-phase NMR analysis.

The PTFE samples with the branched structure were also subjected to a wear test. The sample irradiated with a dose of 10 kGy was hardly different from the original, but at the dose of about 20 kGy, the amount of wear began to decrease (i.e., indicating an improvement in wear resistance), becoming even more smaller at 50 kGy and 100 kGy. It is known that if a three-dimensional branched structure (crosslinked structure) is formed in PTFE, the noncrystalline portion becomes less likely to deform, with the result that the resin is suppressed from wearing away in the form of fibers or films to thereby exhibit better wear resistance (non-patent document 3). The decreased amount of wear in the wear test indicates the formation of a three-dimensional branched structure and it is at the irradiation dose where the amount of wear started to decrease that the three-dimensional branched structure began to form. To state more specifically, in the process of irradiating PTFE at a temperature of 340° C. in order to impart a branched structure, more of the branched structure will form in response to the increasing dose and it is obvious that the first forming two-dimensional branched structure begins to shift toward a three-dimensional branched structure when the dose exceeds 10 kGy to reach 20 kGy. The conventional PTFE resin has a straight-chained molecular structure but upon irradiation at a temperature equal to or above its melting point, a two-dimensional branched structure is formed in it if the irradiation dose is no more than 10 kGy. In this case, the smaller the irradiation dose, the fewer the branching points that are formed, yielding a structure having a longer distance between branching points (i.e., a long-chain branched structure).

Example 3

(Tensile Test Under Heat)

Tensile elongation at break was evaluated at elevated temperature. To state more specifically, the tape sample prepared in Example 1 was cut into strips (20 mm wide by 50 mm long) and, with a 100-g weight suspended from each of them, the strips were placed in a constant-temperature bath and evaluated for their tensile elongation at break at temperatures above the melting point of PTFE. The test was started at 330° C. and after confirming that the material did not break even when it was held for 20 minutes at that point, the temperature was raised by an increment of 10° C.; this procedure was repeated until the material broke. The non-irradiated, original PTFE resin had an elongation at break of about 140% whereas the PTFE irradiated to have a two-dimensional branched structure displayed a maximum elongation at break of about 600%, an extremely high value that was more than four times the value for the original. Even the strip irradiated with 10 kGy of gamma rays showed an elongation nearly twice the value for the original. The results are shown in FIG. 1.

Example 4

(Extruding Rods in Molten State)

For processing by extrusion into rods, an extrusion-molding machine of the type shown in FIG. 2 was employed. To process rods of various sizes and shapes, the nozzle section was so adapted as to allow for nozzle replacement. The feed was both the PTFE resins prepared in Example 1 (by irradiation at doses of 0.1, 0.2, 0.4, 0.6, 0.8, 1.0, 1.5, 3.0, 5.0, 10 and 50 kGy) and a commercial grade of PTFE resin (product of NICHIAS Corporation; NAFLON® PTFE rod TOMBO® No. 9002). Each of these resins was fed into the extrusion-molding machine of FIG. 2 and after 1-hr preliminary heating at 330, 350, 370 or 390° C., extrusion molding was performed at the indicated temperatures. As it turned out, the PTFE that had been subjected to pre-irradiation with gamma rays at the doses of 0.1, 0.2, 0.4, 0.6, 0.8, 1.0, 1.5, 3.0, 5.0 and 10 kGy to form a two-dimensional branched structure (long-chain branched structure) could be extruded into a continuous, smooth-surfaced rod through all nozzle diameters (0.1, 0.5, 2.5, and 10 mm) while maintaining the circular nozzle shape. The extruding action was performed at pressures of 0.1-2 MPa. The rods extruded from the PTFE resin irradiated with 50 kGy of gamma rays were fragile and had a tendency to break easily. In contrast, the original PTFE resin required so high pressures to extrude (0.2-6 MPa) that the resulting extrudates did not maintain the nozzle shape but deformed to have surfaces with low gloss; in addition, the extrudate was not continuous but broke apart into lengths of several millimeters to several centimeters.

TABLE 1

Results of Extruding Rods in Example 4
(Extrusion temperature: 330-350° C.)

| Dose | Nozzle diameter (mm) | | | | |
|---|---|---|---|---|---|
| (kGy) | φ0.1 | φ0.5 | φ2 | φ5 | φ10 |
| 0 | X | X | Δ | Δ | Δ |
| 0.1 | — | ◯ | ◯ | ◯ | ◯ |
| 0.2 | X | — | ◯ | — | — |
| 0.4 | — | ◯ | ◯ | — | — |
| 0.6 | — | — | ◯ | — | — |
| 0.8 | — | ◯ | ◯ | ◯ | ◯ |
| 1.0 | ◯ | ◯ | ◯ | ◯ | ◯ |
| 1.5 | — | — | ◯ | — | — |
| 3.0 | — | — | ◯ | — | — |
| 5.0 | — | — | ◯ | — | — |
| 10 | X | ◯ | ◯ | ◯ | ◯ |
| 50 | — | Δ | Δ | Δ | Δ |

X: Extrusion impossible.
Δ: Could not be extruded in predetermined sizes but broke
◯
smooth surfaces.)
—: No data.
Table 1. Results of Extruding Rods in Example 4
(Extrusion temperature: 330-350° C.)

TABLE 2

Results of Extruding Rods in Example 4
(Nozzle diameter: 0.5$^\phi$)

| Dose | Extrusion temperature (° C.) | | | |
|---|---|---|---|---|
| (kGy) | 330 | 350 | 370 | 390 |
| 0 | X | X | X | X |
| 0.1 | ◯ | ◯ | ◯ | ◯ |
| 1.0 | ◯ | ◯ | ◯ | ◯ |
| 10 | ◯ | ◯ | Δ | Δ |
| 50 | Δ | Δ | Δ | Δ |

X: Extrusion impossible.
Δ: Could not be extruded in predetermined sizes but broke apart halfway the length; did not have smooth surfaces.
◯: Could be extruded (in predetermined sizes and with smooth surfaces.)
—: No data.

Example 5

(Extruding Films in Molten State)

For processing by extrusion into films, an extrusion-molding machine of the type shown in FIG. 2 was employed, except that the profile of the nozzle section was changed from the circular shape to a slit. The feed was both the PTFE resins prepared in Example 1 (by irradiation at doses of 0.1, 0.4, 0.8, 1.0, 3.0, 5.0, 10 and 50 kGy) and a commercial grade of PTFE resin. Each of these resins was fed into the extrusion-molding machine and after 1-hr preliminary heating at 330-350° C., extrusion molding was performed at the indicated temperatures. As it turned out, the PTFE that had been subjected to pre-irradiation with gamma rays at the doses of 0.1, 0.4, 0.8, 1.0, 3.0, 5.0 and 10 kGy to form a two-dimensional branched structure (long-chain branched structure) could be extruded into a continuous film through the slit. By changing the slit profile as 0.05×30 mm, 0.5×30 mm, 1.0×30 mm or 3.0×30 mm, films could be obtained in the same thicknesses as the respective slit widths. The results are shown in Table 3. The non-irradiated, original PTFE resin did not flow smoothly and the resin particles also failed to coalesce adequately, so the resin itself was difficult to extrude and, if extruded, the resulting film was not uniform but had some cracks and holes.

TABLE 3

Results of Extruding Films in Example 5
(Extrusion temperature: 330-350° C.)

| Dose | Slit Profile (mm) | | | |
|---|---|---|---|---|
| (kGy) | 0.05 × 30 | 0.5 × 30 | 1.0 × 30 | 3.0 × 30 |
| 0 | X | Δ | Δ | Δ |
| 0.1 | Δ | ○ | — | — |
| 0.4 | ○ | ○ | — | — |
| 0.8 | ○ | ○ | — | — |
| 1.0 | ○ | ○ | ○ | ○ |
| 3.0 | — | ○ | — | — |
| 5.0 | — | ○ | — | — |
| 10 | — | ○ | ○ | ○ |
| 50 | — | Δ | Δ | Δ |

X: Extrusion impossible.
Δ: Could not be extruded in predetermined sizes but broke apart halfway the length; did not have smooth surfaces.
○: Could be extruded (in predetermined sizes and with smooth surfaces.)
—: No data.

Example 6

(Extruding Tubes in Molten State)

For processing by extrusion into tubes, an extrusion-molding machine of the type shown in FIG. 2 was employed, except that a core pin was built into the nozzle section. The feed was both the PTFE resins prepared in Example 1 (by irradiation at doses of 0.1, 0.4, 1.0, 5.0, 10 and 50 kGy) and a commercial grade of PTFE resin. Each of these resins was fed into the extrusion-molding machine and after 1-hr preliminary heating at 330-350° C., extrusion molding was performed at the indicated temperatures. As it turned out, the PTFE that had been subjected to pre-irradiation with gamma rays at the doses of 0.1, 0.4, 1.0, 5.0 and 10 kGy to form a two-dimensional branched structure (long-chain branched structure) could be extruded into a continuous tube through the nozzle. By changing the shapes of the nozzle and core pin, tubes in various combinations of outside diameter (O.D.), inside diameter (I.D.) and wall thickness (W.T.) could be obtained. The results are shown in Table 4. On the other hand, the non-irradiated, original PTFE resin could not be extruded into tubes having any desired sizes.

TABLE 4

Results of Extruding Tubes in Example 6
(Extrusion temperature: 330-350° C.)

| | Tube Profile (mm) | | | |
|---|---|---|---|---|
| Dose (kGy) | O.D. 0.50 I.D. 0.10 W.T. 0.20 | O.D. 5.00 I.D. 4.90 W.T. 0.05 | O.D. 5.00 I.D. 3.00 W.T. 1.00 | O.D. 10.0 I.D. 8.0 W.T. 1.0 |
| 0 | X | X | Δ | Δ |
| 0.1 | ○ | ○ | ○ | ○ |
| 0.4 | ○ | ○ | ○ | — |
| 1.0 | ○ | ○ | ○ | ○ |
| 5.0 | — | — | ○ | — |
| 10 | Δ | Δ | ○ | ○ |
| 50 | — | — | Δ | — |

X: Extrusion impossible.
Δ: Could not be extruded in predetermined sizes but broke apart halfway the length; did not have smooth surfaces.
○: Could be extruded (in predetermined sizes and with smooth surfaces.)
—: No data.

Example 7

(Melt Stamping)

For melt stamping of PTFE resin, melt-stamping machines of the types shown in FIGS. 3 and 4 were employed. The feed was both the PTFE resins prepared in Example 1 (by irradiation at doses of 0.1, 1.0, 5.0, 10 and 50 kGy) and a commercial grade of PTFE resin. Each of these resins was fed into the stamping machines and after 1-hr preliminary heating at 330-350° C., stamping was performed at the indicated temperatures. As it turned out, the PTFE that had been subjected to pre-irradiation with gamma rays at the doses of 0.1, 1.0, 5.0 and 10 kGy to form a two-dimensional branched structure (long-chain branched structure) spread to every corner of the dies to form shapes of the predetermined sizes and the desired surface state. On the other hand, the non-irradiated, original PTFE resin did not flow smoothly and failed to spread to every corner of the dies, with the result that no desired shapes could be obtained. The result of stamping with a ring-shaped die (see FIG. 3) is shown in Table 5, and that of stamping with a block-shaped die (see FIG. 4) is shown in Table 6.

TABLE 5

Results of Stamping Rings in Example 7

| Dose | Die temperature (° C.) | | | |
|---|---|---|---|---|
| (kGy) | 330 | 350 | 370 | 390 |
| 0 | X | X | X | X |
| 0.1 | ○ | ○ | ○ | ○ |
| 1.0 | ○ | ○ | ○ | ○ |
| 10 | ○ | ○ | — | — |
| 50 | X | X | X | X |

X: Stamping impossible (shaped articles of desired size could not be formed).
○: Stamping possible (shaped articles could be formed in predetermined size and with smooth surfaces.)
—: No data.

TABLE 6

Results of Stamping Blocks in Example 7

| Dose | Die temperature (° C.) | | | |
|---|---|---|---|---|
| (kGy) | 330 | 350 | 370 | 390 |
| 0 | X | X | X | X |
| 0.1 | ○ | ○ | ○ | — |
| 1.0 | ○ | ○ | ○ | — |
| 10 | ○ | ○ | — | — |
| 50 | X | X | X | X |

X: Stamping impossible (shaped articles of desired size could not be formed).
○: Stamping possible (shaped articles could be formed in predetermined size and with smooth surfaces.)
—: No data.

Example 8

(Extruding Rods in Solid Phase)

An extrusion-molding machine of the type shown in FIG. 2 was employed to extrude rods in a solid phase. Circular nozzles were selected and the feed was both the PTFE resins prepared in Example 1 (by irradiation at doses of 0.1, 0.4, 1.0, 3.0, 5.0, 10 and 50 kGy) and a commercial grade of PTFE resin. Each of these resins was fed into the extrusion-molding machine and after 1-hr preliminary heating at 210, 240, 270, 300 or 320° C., extrusion molding was performed at the indicated temperatures. As it turned out, the PTFE that had been subjected to pre-irradiation with gamma rays at the doses of 0.1, 0.4, 1.0, 3.0, 5.0 and 10 kGy to form a two-dimensional branched structure (long-chain branched structure) could be extruded into a continuous, smooth-surfaced rod through all nozzle diameters (0.1, 0.5, 2.5, and 10 mm) while maintaining the circular nozzle shape. The extruding action was performed at pressures of 0.1-10 MPa. Whichever temperatures were chosen, the rods extruded from the PTFE resin irradiated with 50 kGy of gamma rays were fragile and had a tendency to break easily. In contrast, the original PTFE resin required so high pressures to extrude (0.2-30 MPa) that the resulting extrudate did not maintain the nozzle shape but deformed to have surfaces with low gloss; in addition, only short rods with lengths of several millimeters to several centimeters were obtained intermittently. Whichever temperatures were used, no satisfactory products were obtained. The results of extrusion with varying nozzle diameters are shown in Table 7, and those of extrusion at varying temperatures are shown in Table 8.

TABLE 7

Results of Extruding Rods in Example 8
(Extrusion temperature: 330-320° C.)

| Dose | Nozzle diameter (mm) | | | | |
|---|---|---|---|---|---|
| (kGy) | φ0.1 | φ0.5 | φ2 | φ5 | φ10 |
| 0 | X | X | Δ | Δ | Δ |
| 0.1 | — | ○ | ○ | ○ | ○ |
| 0.4 | — | — | ○ | — | — |
| 1.0 | ○ | ○ | ○ | ○ | ○ |
| 3.0 | — | — | ○ | — | — |
| 5.0 | — | — | ○ | — | — |
| 10 | X | ○ | ○ | ○ | ○ |
| 50 | — | Δ | Δ | Δ | Δ |

X: Extrusion impossible.
Δ: Could not be extruded in predetermined sizes but broke apart halfway the length; did not have smooth surfaces.
○: Could be extruded (in predetermined sizes and with smooth surfaces.)
—: No data.

TABLE 8

Results of Extruding Rods in Example 8
(Nozzle diameter: 0.5^φ)

| Dose | Extrusion temperature (° C.) | | | | |
|---|---|---|---|---|---|
| (kGy) | 210 | 240 | 270 | 310 | 320 |
| 0 | X | X | X | X | X |
| 0.1 | Δ | Δ | ○ | ○ | ○ |
| 1.0 | ○ | ○ | ○ | ○ | ○ |
| 10 | Δ | Δ | Δ | Δ | ○ |
| 50 | Δ | Δ | Δ | Δ | Δ |

X: Extrusion impossible.
Δ: Could not be extruded in predetermined sizes but broke apart halfway the length; did not have smooth surfaces.
○: Could be extruded (in predetermined sizes and with smooth surfaces.)
—: No data.

Example 9

(Rolling in Solid Phase)

Using a rolling machine (roller press), sheets were made by rolling in a solid phase. The feed was both the PTFE resins prepared in Example 1 (by irradiation at doses of 0.1, 1.0, 10 and 50 kGy) and a commercial grade of PTFE resin. Each of these resins was fed into the roller press and rolled at temperatures of 300 and 320° C. to form 1-mm thick sheets. In the PTFE resin irradiated with 50 kGy of gamma rays, the resin particles did not sufficiently coalesce together to form uniform sheets. The non-irradiated original PTFE resin was so hard that it did not sufficiently deform to make sheets. The results of the rolling operation are shown in Table 9.

TABLE 9

Results of Forming Sheets by Rolling in Example 9
(Thickness: 1 mm)

| Dose | Rolling temperature (° C.) | |
|---|---|---|
| (kGy) | 300 | 320 |
| 0 | X | X |
| 0.1 | ○ | ○ |
| 1.0 | ○ | ○ |
| 10 | X | ○ |
| 50 | X | X |

X: Rolling impossible.
○: Could be rolled (in predetermined sizes and with smooth surfaces.)

Example 10

(Shaping Monofilaments by Drawing in Solid Phase)

The PTFE resin prepared in Example 1 (by irradiation at a dose of 0.8 kGy) was melt spun to form monofilaments. More specifically, the resin was fed into a simplified model of melt spinning apparatus and as it was in a molten state, the resin was extruded under pressure and the emerging resin was drawn at room temperature to form monofilaments with diameters of 0.01-0.5 mm. The results of drawing at a ratio of about 40 are shown in Table 10, and those of drawing at a ratio of about 10 is shown in Table 11.

TABLE 10

Results of Shaping Monofilaments by Drawing in Example 10
(Draw ratio: ca. 40)

| Test run | Success of processing | Diameter of monofilaments (mm) |
|---|---|---|
| ① | X | — |
| ② | ○ | 0.030 |
| ③ | Δ | 0.023 |
| ④ | X | — |
| ⑤ | ○ | 0.010 |
| ⑥ | ○ | 0.015 |
| ⑦ | ○ | 0.010 |

TABLE 11

Results of Shaping Monofilaments by Drawing in Example 10
(Draw ratio: ca. 10)

| Test run | Success of processing | Diameter of monofilaments (mm) |
|---|---|---|
| ① | ○ | 0.430 |
| ② | Δ | 0.700~1.200 |
| ③ | X | — |
| ④ | ○ | 0.497 |
| ⑤ | ○ | 0.501 |
| ⑥ | ○ | 0.507 |
| ⑦ | ○ | 0.312 |

X: Drawing impossible.
Δ: Only uneven drawing was possible.
○: Uniform drawing was possible (continuous drawing was possible).

Example 11

(Shaping of Drawn Films by Drawing Extruded Films in Solid Phase)

The 0.050-mm thick film that was prepared in Example 5 was drawn in two directions to form heat-shrinkable films. The longitudinal direction was parallel to the direction of extrusion in Example 5 and the transverse direction was perpendicular to it. Drawing was done by simultaneous biaxial orientation at a speed of 30 mm/min using a polymeric film, biaxial stretching machine of SHIBAYAMA SCIENTIFIC CO., LTD. Table 12 shows the irradiation doses for the PTFE and the draw ratios at the longitudinal and transverse directions.

TABLE 12

Results of Shaping Heat Shrinkable Films by Drawing Extruded Films in Example 11

| Dose (kGy) | Drawing conditions | | Evaluation of drawn films | |
|---|---|---|---|---|
| | Draw ratio in longitudinal direction | Draw ratio in transverse direction | Thickness of drawn film (mm) | Rating |
| 0.1 | 2 | 2 | 0.029 | ○ |
| | 3 | 3 | 0.017 | ○ |
| | 5 | 5 | — | X |
| 0.4 | 2 | 2 | 0.027 | ○ |
| | 3 | 3 | 0.021 | ○ |
| | 5 | 5 | — | X |
| 0.8 | 2 | 2 | 0.025 | ○ |
| | 3 | 3 | 0.016 | ○ |
| | 5 | 5 | 0.011 | ○ |
| | 10 | 10 | — | X |
| 1.0 | 2 | 2 | 0.029 | ○ |
| | 3 | 3 | 0.020 | ○ |
| | 5 | 5 | 0.010 | ○ |
| 1.5 | 2 | 2 | 0.024 | ○ |
| | 3 | 3 | — | X |
| 3.0 | 2 | 2 | 0.028 | ○ |
| | 3 | 3 | 0.020 | ○ |
| 10 | 2 | 2 | — | X |
| 50 | 2 | 2 | — | X |

X: could not be drawn (breaks, cracks or holes occurred)
○: could be drawn (uniform drawing)

Example 12

(Heat Shrinking Properties of the Drawn Films Prepared in Example 11)

The heat-shrinkable films prepared in Example 11 were held in a constant-temperature bath with 340° C. for 10 minutes; to evaluate the performance of the heat-shrinkable films, the percent recovery was determined by the following formula: [(Dimensions after shrinkage)/(Dimensions before drawing)×100]. Each of the tested films exhibited nearly 100% recovery, indicating their capacity to function as heat-shrinkable films.

TABLE 13

Heat Shrinking Performance of the Drawn Films Prepared in Example 11

| Dose (kGy) | Shrink ratio (the reciprocal of draw ratio) | Percent recovery | | |
|---|---|---|---|---|
| | | Longitudinal direction | Transverse thickness | Across |
| 0.1 | 1/2 | 103 | 101 | 102 |
| | 1/3 | 102 | 105 | 101 |
| | 1/5 | — | — | — |
| 0.4 | 1/2 | 103 | 102 | 102 |
| | 1/3 | — | — | — |
| | 1/5 | — | — | — |
| 0.8 | 1/2 | 101 | 102 | 102 |
| | 1/3 | 103 | 102 | 101 |
| | 1/5 | 102 | 102 | 103 |
| | 1/10 | — | — | — |
| 1.0 | 1/2 | 101 | 103 | 101 |
| | 1/3 | 103 | 101 | 103 |
| | 1/5 | 101 | 104 | 103 |
| 1.5 | 1/2 | 103 | 102 | 101 |
| | 1/3 | — | — | — |
| 3.0 | 1/2 | 102 | 104 | 103 |
| | 1/3 | 103 | 101 | — |
| 10 | 1/2 | — | — | — |
| 50 | 1/2 | — | — | — |

—: Not measured since drawn films could not be prepared.

Example 13

(Shaping of Drawn Films by Drawing Extruded Films in Solid Phase)

The 0.050-mm thick film that was prepared in Example 5 was drawn in two directions to form heat-shrinkable films. The drawing method was the same as described in Example 11. Table 14 shows the irradiation doses for the PTFE and the draw ratios at the longitudinal and transverse directions.

TABLE 14

Results of Shaping Heat Shrinkable Films by Drawing Extruded Films in Example 13

| Dose (kGy) | Drawing conditions | | Evaluation of drawn films | |
|---|---|---|---|---|
| | Draw ratio in longitudinal direction | Draw ratio in transverse direction | Thickness of drawn film (mm) | Rating |
| 0.1 | 2 | 2 | 0.282 | ○ |
| | 5 | 5 | 0.124 | ○ |
| | 8 | 8 | — | X |
| 0.4 | 5 | 5 | 0.115 | ○ |
| | 8 | 8 | — | X |
| | 10 | 10 | — | X |
| 0.8 | 5 | 5 | 0.103 | ○ |
| | 8 | 8 | 0.087 | ○ |
| | 10 | 10 | 0.054 | ○ |
| | 20 | 20 | — | X |
| 1.0 | 5 | 5 | 0.113 | ○ |
| | 8 | 8 | 0.088 | ○ |
| | 10 | 10 | 0.057 | ○ |
| 1.5 | 8 | 8 | 0.092 | ○ |
| | 10 | 10 | — | X |
| 3.0 | 5 | 5 | 0.104 | ○ |
| | 8 | 8 | — | X |
| 10 | 3 | 3 | — | X |
| 50 | 3 | 3 | — | X |

X: could not be drawn (breaks, cracks or holes occurred)
○: could be drawn (uniform drawing)

Example 14

(Heat Shrinking Properties of the Drawn Films Prepared in Example 13)

The heat-shrinkable films prepared in Example 13 were held in a constant-temperature bath with 340° C. for 10 minutes; to evaluate the performance of the heat-shrinkable films, the percent recovery was determined by the following formula: [(Dimensions after shrinkage)/(Dimensions before drawing)×100]. Each of the tested films exhibited nearly 100% recovery, indicating their capacity to function as heat-shrinkable films.

TABLE 15

Heat Shrinking Performance of the Drawn Films Prepared in Example 13

| Dose (kGy) | Shrink ratio (the reciprocal of draw ratio) | Percent recovery Longitudinal direction | Transverse direction | Across thickness |
|---|---|---|---|---|
| 0.1 | 1/2 | 102 | 103 | 103 |
|  | 1/5 | 103 | 105 | 101 |
|  | 1/8 | — | — | — |
| 0.4 | 1/5 | 101 | 102 | 101 |
|  | 1/8 | — | — | — |
|  | 1/10 | — | — | — |
| 0.8 | 1/5 | 102 | 101 | 102 |
|  | 1/8 | 103 | 101 | 102 |
|  | 1/10 | 101 | 103 | 103 |
|  | 1/20 | — | — | — |
| 1.0 | 1/5 | 102 | 100 | 102 |
|  | 1/8 | 102 | 101 | 101 |
|  | 1/10 | 101 | 104 | 102 |
| 1.5 | 1/8 | 102 | 102 | 103 |
|  | 1/10 | — | — | — |
| 3.0 | 1/5 | 102 | 104 | 102 |
|  | 1/8 | — | — | — |
| 10 | 1/3 | — | — | — |
| 50 | 1/3 | — | — | — |

—: Not measured since drawn films could not be prepared.

Example 15

(Shaping of Drawn Films by Stretching Non-Irradiated and Irradiated Commercial Films in Solid Phase)

A commercial PTFE film (product of NICHIAS Corporation; NAFLON® PTFE film TOMBO® No. 9000 sized 100 mm long by 100 mm wide by 0.50 mm thick) was irradiated with gamma rays at doses of 0.1, 0.8, 1.0, 1.5, 3.0, 10 and 100 kGy by the same method as used in Example 1 to thereby prepare PTFE films having a two-dimensional branched structure (long-chain branched structure). These films as well as a non-irradiated film (0 kGy) were subjected to simultaneous biaxial orientation by the same method as used in Example 11, and the thus drawn films were evaluated for their performance. The non-irradiated film could not be drawn by a ratio of 5 but the irradiated films could be drawn by a ratio of 10.

TABLE 16

Results of Shaping Heat Shrinkable Films by Drawing Commercial Film and Irradiated Films in Example 15

| Dose (kGy) | Evaluation of drawn films Draw ratio in longitudinal direction | Draw ratio in transverse direction | Drawing conditions Thickness of drawn film (mm) | Rating |
|---|---|---|---|---|
| 0 | 2 | 2 | 0.282 | ○ |
|  | 3 | 3 | 0.206 | ○ |
|  | 5 | 5 | 0.113 | X |
| 0.1 | 2 | 2 | 0.271 | ○ |
|  | 5 | 5 | 0.112 | ○ |
|  | 8 | 8 | 0.087 | ○ |
| 0.8 | 5 | 5 | 0.120 | ○ |
|  | 8 | 8 | 0.083 | ○ |
|  | 10 | 10 | 0.059 | ○ |
|  | 20 | 20 | — | X |
| 1.0 | 5 | 5 | 0.117 | ○ |
|  | 8 | 8 | 0.082 | ○ |
|  | 10 | 10 | 0.058 | ○ |
| 1.5 | 8 | 8 | 0.079 | ○ |
|  | 10 | 10 | 0.052 | ○ |
| 3.0 | 5 | 5 | 0.109 | ○ |
|  | 8 | 8 | — | X |
| 10 | 3 | 3 | — | X |

X: could not be drawn (breaks, cracks or holes occurred)
○: could be drawn (uniform drawing)

Example 16

(Heat Shrinking Properties of the Drawn Films Prepared in Example 15)

The heat-shrinkable films prepared in Example 15 were processed by the same method as in Example 12. They were held in a constant-temperature bath with 340° C. for 10 minutes; to evaluate the performance of the heat-shrinkable films, the percent recovery was determined by the following formula: [(Dimensions after shrinkage)/(Dimensions before drawing)×100]. Each of the tested films exhibited nearly 100% recovery, indicating their capacity to function as heat-shrinkable films.

TABLE 17

Heat Shrinking Performance of the Drawn Films Prepared in Example 15

| Dose (kGy) | Shrink ratio (the reciprocal of draw ratio) | Percent recovery Longitudinal direction | Transverse direction | Across thickness |
|---|---|---|---|---|
| 0 | 1/2 | 102 | 103 | 102 |
|  | 1/3 | 103 | 103 | 103 |
|  | 1/5 | 103 | 104 | 102 |
| 0.1 | 1/2 | 102 | 101 | — |
|  | 1/5 | 102 | 102 | 103 |
|  | 1/8 | 101 | 102 | 102 |
| 0.8 | 1/5 | 102 | 101 | 102 |
|  | 1/8 | 101 | 102 | 101 |
|  | 1/10 | 102 | 102 | 102 |
|  | 1/20 | — | — | — |
| 1.0 | 1/5 | 102 | 102 | 101 |
|  | 1/8 | 102 | 101 | 102 |
|  | 1/10 | 101 | 102 | 102 |
| 1.5 | 1/8 | 101 | 103 | 103 |
|  | 1/10 | 103 | 103 | 101 |
| 3.0 | 1/5 | 102 | 102 | 103 |
|  | 1/8 | — | — | — |
| 10 | 1/3 | — | — | — |

—: measured since drawn films could not be prepared.

Example 17

(Shaping of Heat Shrinkable Tubes by Drawing in Solid Phase)

Using the tubes processed in Example 6 to have an outside diameter of 5.0 mm, an inside diameter of 4.9 mm, and a wall thickness of 0.05 mm, heat-shrinkable tubes were prepared by means of an inflation apparatus of the type shown in FIG. 5. Each tubular preform was blown by being filled with nitrogen gas and then cooled under pressure to form a heat-shrinkable tube. The blow ratio was changed by adjusting the diameter of the glass cylinder as a guide. By blowing at a ratio of 5, extremely thin-walled heat-shrinkable tubes could be prepared. On the other hand, no desirable heat-shrinkable tubes could be prepared from the non-irradiated PTFE.

TABLE 18

Results of Shaping Extremely Thin-Walled Heat Shrinkable Tubes by Tube Drawing in Example 17

| Dose (kGy) | Blow ratio [(O.D. after drawing)/ (O.D. before drawing)] | Wall thickness (mm) | Rating |
|---|---|---|---|
| 0 | 2 | — | — |
|   | 3 | — | — |
|   | 5 | — | — |
| 0.1 | 2 | 0.026 | ○ |
|   | 3 | 0.022 | ○ |
|   | 5 | 0.011 | X |
| 0.4 | 2 | 0.024 | ○ |
|   | 3 | 0.021 | ○ |
|   | 5 | 0.013 | ○ |
| 1.0 | 2 | 0.025 | ○ |
|   | 3 | 0.022 | ○ |
|   | 5 | 0.012 | ○ |

X: could not be drawn (breaks, cracks or holes occurred)
○: could be drawn (uniform drawing)
—: Not measured since heat-shrinkable tubes could not be prepared.

Example 18

(Heat Shrinking Properties of the Heat Shrinkable Tubes Prepared in Example 17)

The heat-shrinkable tubes prepared in Example 17 were processed by the same method as in Example 12. They were held in a constant-temperature bath with 340° C. for 10 minutes; to evaluate the performance of the heat-shrinkable tubes, the percent recovery was determined by the formula of [(Dimensions after shrinkage)/(Dimensions before drawing)× 100] from the ratio of the value after shrinkage to that before shrinkage for each of the outside diameter and wall thickness. Each of the tested tubes exhibited nearly 100% recovery, indicating their high capacity to function as extremely thin-walled heat-shrinkable tubes.

TABLE 19

Heat Shrinking Performance of Extremely Thin-Walled Heat Shrinkable Tubes Prepared in Example 17

| | | Percent recovery (%) | |
|---|---|---|---|
| Dose (kGy) | Shrink ratio (the reciprocal of draw ratio) | O.D. (after shrinkage)/ (before shrinkage)] | Thickness [(after shrinkage)/ (before shrinkage)] |
| 0 | 1/2 | — | — |
|   | 1/3 | — | — |
|   | 1/5 | — | — |
| 0.1 | 1/2 | 101 | 101 |
|   | 1/3 | 103 | 101 |
|   | 1/5 | 104 | — |
| 0.4 | 1/2 | 103 | 103 |
|   | 1/3 | 102 | 101 |
|   | 1/5 | 105 | 105 |
| 1.0 | 1/2 | 103 | 102 |
|   | 1/3 | 101 | 102 |
|   | 1/5 | 103 | 104 |

—: Not measured since heat-shrinkable tubes could not be prepared.

Example 19

(Shaping of Heat Shrinkable Tubes by Drawing in Solid Phase)

Using the tubes processed in Example 6 to have an outside diameter of 5.0 mm, an inside diameter of 3.0 mm, and a wall thickness of 1.0 mm, heat-shrinkable tubes were prepared by means of an inflation apparatus of the type shown in FIG. 5. Each tubular preform was blown by being filled with nitrogen gas and then cooled under pressure to form a heat-shrinkable tube. The blow ratio was changed by adjusting the diameter of the glass cylinder as a guide. By blowing at a ratio of 5, extremely thin-walled heat-shrinkable tubes could be prepared. On the other hand, no desirable heat-shrinkable tubes could be prepared from the non-irradiated PTFE.

TABLE 20

Results of Shaping Extremely Thin-Walled Heat Shrinkable Tubes by Tube Drawing in Example 19

| Dose (kGy) | Blow ratio [(O.D. after drawing)/ (O.D. before drawing)] | Wall thickness (mm) | Rating |
|---|---|---|---|
| 0 | 2 | — | — |
|   | 5 | — | — |
|   | 8 | — | — |
| 0.1 | 2 | 0.551 | ○ |
|   | 5 | 0.210 | ○ |
|   | 8 | 0.141 | X |
| 0.4 | 2 | 0.543 | ○ |
|   | 5 | 0.206 | ○ |
|   | 8 | 0.136 | ○ |
|   | 10 | 0.103 | X |
| 1.0 | 2 | 0.528 | ○ |
|   | 5 | 0.201 | ○ |
|   | 8 | 0.132 | ○ |
|   | 10 | 0.101 | ○ |

X: could not be drawn (breaks, cracks or holes occurred)
○: could be drawn (uniform drawing)
—: Not measured since heat-shrinkable tubes could not be prepared.

Example 20

(Heat Shrinking Properties of the Heat Shrinkable Tubes Prepared in Example 19)

The heat-shrinkable tubes prepared in Example 19 were processed by the same method as in Example 12. They were held in a constant-temperature bath with 340° C. for 10 minutes; to evaluate the performance of the heat-shrinkable tubes, the percent recovery was determined by the following formula of [(Dimensions after shrinkage)/(Dimensions before drawing)×100] from the ratio of the value after shrinkage to that before shrinkage for each of the outside diameter and wall thickness. Each of the tested tubes exhibited nearly 100% recovery, indicating their high capacity to function as extremely thin-walled heat-shrinkable tubes.

TABLE 21

Heat Shrinking Performance of Extremely Thin-walled Heat Shrinkable Tubes Prepared in Example 19

| | | Percent recovery | |
|---|---|---|---|
| Dose (kGy) | Shrink ratio (the reciprocal of draw ratio) | O.D. [(after shrinkage)/ (before shrinkage)] | Thickness [(after shrinkage)/ (before shrinkage)] |
| 0 | 1/2 | — | — |
|   | 1/5 | — | — |
|   | 1/8 | — | — |
| 0.1 | 1/2 | 102 | 101 |
|   | 1/5 | 103 | 101 |
|   | 1/8 | 102 | — |
| 0.4 | 1/2 | 101 | 103 |
|   | 1/5 | 102 | 102 |
|   | 1/8 | 104 | 105 |
|   | 1/10 | 103 | — |

TABLE 21-continued

Heat Shrinking Performance of Extremely Thin-walled
Heat Shrinkable Tubes Prepared in Example 19

| Dose (kGy) | Shrink ratio (the reciprocal of draw ratio) | Percent recovery | |
|---|---|---|---|
| | | O.D. [(after shrinkage)/(before shrinkage)] | Thickness [(after shrinkage)/(before shrinkage)] |
| 1.0 | 1/2 | 102 | 102 |
| | 1/5 | 103 | 101 |
| | 1/8 | 104 | 103 |
| | 1/10 | 104 | 102 |

—: Not measured since heat-shrinkable tubes could not be prepared.

Example 21

(Lamination onto Aluminum Foil)

The PTFE resin samples prepared in Example 1 were laminated onto aluminum foil by means of a melt extruding lamination machine. Each resin sample was fed into the hopper of the lamination machine, through which it was melt extruded at 380° C. over a 50-μm thick aluminum foil to form a PTFE lamination about 20 μm thick. The non-irradiated PTFE was poorly ductile and exhibited only low adhesion to the aluminum foil, so that no uniform laminated film could be prepared. On the other hand, the PTFE samples irradiated to have a two-dimensional branched structure were sufficiently improved in ductility and adhesion that uniform PTFE resin lamination could be applied to the aluminum foil.

TABLE 22

Results of Lamination in Example 21

| Dose (kGy) | Resin ductility | Resin failed to cover to Al foil | Rating |
|---|---|---|---|
| 0 | Peeling occurred foil in some areas | Lamination impossible | Lamination possible |
| 0.1 | No problems | No problems | Lamination possible |
| 1.0 | No problems | No problems | Lamination possible |
| 10 | No problems | No problems | Lamination possible |

The invention claimed is:

1. A process for producing a polytetrafluoroethylene resin having a two-dimensional branch structure, comprising polytetrafluoroethylene having a two-dimensional branched structure in the molecule, which process comprises
exposing polytetrafluoroethylene to an ionizing radiation at a dose of less than 1 kGy at a temperature not lower than a melting point of un-irradiated polytetrafluoroethylene and in the absence of oxygen and further comprises any one of the following steps:
extruding the irradiated polytetrafluoroethylene;
compressing the irradiated polytetrafluoroethylene in a mold;
rolling the irradiated polytetrafluoroethylene; or
melt spinning the irradiated polytetrafluoroethylene.

2. A process for producing the polytetrafluoroethylene resin according to claim 1, wherein the polytetrafluoroethylene to be exposed to the ionizing radiation is polytetrafluoroethylene which has been heated to a molten state and then cooled.

3. A process for producing the polytetrafluoroethylene resin according to claim 1, the process comprising extruding the irradiated polytetrafluoroethylene at a temperature not lower than a melting point of the irradiated polytetrafluoroethylene to form a rod, fiber, tube or a film of the irradiated polytetrafluoroethylene.

4. A process for producing the polytetrafluoroethylene resin according to claim 1, the process comprising compressing the irradiated polytetrafluoroethylene in a mold at a temperature not lower than a melting point of the irradiated polytetrafluoroethylene to form a shaped article of the irradiated polytetrafluoroethylene.

5. A process for producing the polytetrafluoroethylene resin according to claim 1, the process comprising rolling the irradiated polytetrafluoroethylene at a temperature below a melting point of the irradiated, polytetrafluoroethylene to form a shaped article of the irradiated polytetrafluoroethylene.

6. A process for producing the polytetrafluoroethylene resin according to claim 1, the process comprising melt spinning the irradiated polytetrafluoroethylene to form a monofilament of the irradiated polytetrafluoroethylene.

7. A process for producing the polytetrafluoroethylene resin according to claim 1, the process comprising melt extruding the irradiated polytetrafluoroethylene to form a lamination of the irradiated polytetrafluoroethylene.

8. A process for producing polytetrafluoroethylene having a branched structure, the process comprising:
heating polytetrafluoroethylene at a temperature not lower than the melting point thereof;
irradiating the heated polytetrafluoroethylene with an ionizing radiation at a dose of less than 1 kGy in the absence of oxygen and further comprises any one of the following steps:
extruding the irradiated polytetrafluoroethylene;
compressing the irradiated polytetrafluoroethylene in a mold;
rolling the irradiated polytetrafluoroethylene; or
melt spinning the irradiated polytetrafluoroethylene.

* * * * *